(12) United States Patent
Kim et al.

(10) Patent No.: US 9,950,317 B2
(45) Date of Patent: Apr. 24, 2018

(54) LARGE-SCALE COMPOSITE SYNTHESIS SYSTEM, REACTOR AND COMPOSITE SYNTHESIS METHOD USING THE SAME

(71) Applicant: KOREA INSTITUTE OF ENERGY RESEARCH, Daejeon (KR)

(72) Inventors: Hee-Yeon Kim, Daejeon (KR); Guk-Hyeon Kwon, Gyeongsangbuk-do (KR)

(73) Assignee: KOREA INSTITUTE OF ENERGY RESEARCH (KR)

( * ) Notice: Subject to any disclaimer, the term of this patent is extended or adjusted under 35 U.S.C. 154(b) by 261 days.

(21) Appl. No.: 14/726,892

(22) Filed: Jun. 1, 2015

(65) Prior Publication Data
US 2016/0001281 A1 Jan. 7, 2016

(30) Foreign Application Priority Data
Jun. 3, 2014 (KR) .................. 10-2014-0067439

(51) Int. Cl.
*B01J 12/02* (2006.01)
*B01J 19/06* (2006.01)
*B01J 37/02* (2006.01)
*B01J 19/24* (2006.01)
(Continued)

(52) U.S. Cl.
CPC ............. *B01J 37/0225* (2013.01); *B01J 4/02* (2013.01); *B01J 12/02* (2013.01); *B01J 19/02* (2013.01); *B01J 19/06* (2013.01); *B01J 19/24* (2013.01); *B01J 2204/002* (2013.01); *B01J 2204/007* (2013.01); *B01J 2219/00105* (2013.01); *B01J 2219/0254* (2013.01);
(Continued)

(58) Field of Classification Search
CPC .................................. B01J 12/02; B01J 19/06
See application file for complete search history.

(56) References Cited

U.S. PATENT DOCUMENTS 3,556,841 A * 1/1971 Iwasa .................... C23C 16/402
257/E21.279
4,014,980 A * 3/1977 Fujimaki ............. C30L 325/005
423/447.3
(Continued)

FOREIGN PATENT DOCUMENTS

JP S59208005 11/1984
JP 06316765 A * 11/1994
(Continued)

OTHER PUBLICATIONS

Product Data Sheet for 316/316L Stainless Steel. AK Steel Corporation. (Year: 2007).*

*Primary Examiner* — Jennifer A Leung
(74) *Attorney, Agent, or Firm* — Mark E. Bandy; Rankin, Hill & Clark LLP

(57) ABSTRACT

Disclosed are a large-scale composite synthesis system, a reactor therefor, and a synthesis method using the same, wherein two or more different samples are vaporized in respective vaporizers, and are then fed into a reactor that has a relatively large transverse cross-sectional diameter compared to the connector for transporting the samples in a gas phase and is maintained at a temperature lower than that of the connector, thus producing a powder composite, the composite being synthesized while being electrostatically attached to an adherend surface.

15 Claims, 5 Drawing Sheets

(51) Int. Cl.
*B01J 19/02* (2006.01)
*B01J 4/02* (2006.01)

(52) U.S. Cl.
CPC .............. *B01J 2219/0277* (2013.01); *B01J 2219/0286* (2013.01); *B01J 2219/1946* (2013.01)

(56) References Cited

U.S. PATENT DOCUMENTS

| | | | | |
|---|---|---|---|---|
| 4,484,943 | A * | 11/1984 | Miura | B22F 9/12 118/726 |
| 2005/0204514 | A1 * | 9/2005 | Takamatsu | C01B 13/20 23/305 R |
| 2013/0287643 | A1 | 10/2013 | Kim et al. | |

FOREIGN PATENT DOCUMENTS

| | | |
|---|---|---|
| JP | 2005513264 | 5/2005 |
| KR | 100741759 | 7/2007 |
| KR | 102013012229 | 11/2013 |
| KR | 1020130122102 | 11/2013 |
| KR | 1020130122299 | 11/2013 |
| WO | 2005040038 | 5/2005 |
| WO | 2013160874 | 10/2013 |

* cited by examiner

LARGE-SCALE COMPOSITE SYNTHESIS SYSTEM, REACTOR AND COMPOSITE SYNTHESIS METHOD USING THE SAME

BACKGROUND OF THE INVENTION

1. Field of the Invention

The present invention relates to a system for synthesizing a multiple-metal hybrid composite or a metal-carbon hybrid composite, a reactor for the same, and a composite synthesis method using the same. More particularly, the present invention relates to a large-scale composite synthesis system for synthesizing a powder composite comprising two or more different components while being electrostatically attached to an adherend surface, a reactor for the composite synthesis system, and a composite synthesis method using the composite synthesis system.

2. Description of the Related Art

Recently, in the catalyst research field, the effective decoration of the surface of a catalyst support with metal catalyst particles to efficiently synthesize multiple-metal catalysts, along with the effective alloying of multiple-metal catalyst particles to improve reaction activity or durability, is receiving attention. Also, the synthesis of a carbon-based nano metal catalyst structure is receiving attention because the reaction activity or durability is enhanced. Furthermore, attention is being paid to recovering or recycling the metal component by incinerating the carbon component after the reaction.

With regard to the composite synthesis, Korean Patent Application Publication No. 10-2011-0139994 discloses a lithium manganese oxide-carbon nano composite prepared using a mixing process in an ion solution phase. However, this method is problematic because the composite is synthesized through multiple steps, including solution reaction, crystal growth, strong acid or alkali treatment to remove template components, and thermal treatment for alloy formation.

Hence, the present inventors have filed a method and system for synthesizing a hybrid composite, such as metal-carbon hybrid particles, using a simple co-vaporization process, as disclosed in Korean Patent Application Nos. 10-2012-0045166 and 10-2012-0045516.

Moreover, the present inventors have developed a system and method for mass production of a hybrid composite, such as multiple-metal or metal-carbon hybrid particles, to achieve mass production of the hybrid composite particles and to widen the scope of application thereof. The developed system and method are expected to be popular in the future in preparing a powder composite or a paste having the dispersed powder composite. Also, the multiple-metal or metal-carbon hybrid particles thus synthesized may be easily utilized as a catalyst for a gas reaction, or as an electrode material for a fuel cell and a secondary battery, and expensive metal may be 100% recovered via simple incineration after use.

SUMMARY OF THE INVENTION

Accordingly, the present invention has been made keeping in mind the above problems encountered in the related art, and an object of the present invention is to provide a large-scale composite synthesis system, a reactor for the composite synthesis system, and a composite synthesis method using the composite synthesis system, wherein, to achieve mass production of a hybrid composite in a powder phase, such as multiple-metal or metal-carbon hybrid particles, and to widen the scope of application thereof, a simple co-vaporization process may be performed, thus effectively synthesizing the powder composite.

In order to accomplish the above object, the present invention provides a large-scale composite synthesis system, comprising: a first vaporizer for vaporizing a first sample; a second vaporizer for vaporizing a second sample to be synthesized with the first sample; a first heater for heating the first vaporizer; a second heater for heating the second vaporizer; a connector for connecting the first vaporizer and the second vaporizer to a reactor; and a reactor that receives the first sample and the second sample respectively vaporized in the first vaporizer and the second vaporizer so as to synthesize a composite, wherein the reactor has a relatively large transverse cross-sectional diameter compared to the connector, and is maintained at a temperature lower than a temperature of the connector, and the first sample and the second sample in a gas phase are instantly dispersed due to a pressure difference and a temperature difference when being fed into the reactor from the connector, thereby forming a powder composite, and the powder composite is electrostatically attached to an adherend surface.

In an embodiment, a plate made of a vitreous material or a metal plate may be further provided at a lower portion of the reactor, and the powder composite may be electrostatically attached to the plate made of a vitreous material or the metal plate. As such, a filter made of quartz or a carbon material may be further provided at a lower portion of the reactor, and the plate made of a vitreous material or the metal plate may be disposed on the filter.

In another embodiment, the adherend surface to which the powder composite is electrostatically attached may be an entire inner wall of the reactor made of a vitreous material or a metal material.

In the above two embodiments, the transverse cross-sectional diameter of the reactor is preferably equal to or greater than 15 times a diameter of the connector. For example, the diameter of the connector may be about 3 mm, and the diameter of the reactor may be about 50 mm.

Also, a heating furnace may be further provided around the reactor, and an inside of the reactor is preferably maintained at 60° C. or less. Also, the connector is preferably further provided with a heating line for maintaining the first sample and the second sample in a gas phase, which are transported to the reactor via the connector, at a predetermined temperature, and an inside of the connector is preferably maintained at 60 to 250° C.

The reactor may be made of a vitreous material such as quartz or Pyrex, or a metal material such as stainless steel, aluminum, etc. Also, the first sample and the second sample for forming the composite may be two different kinds of metals, or may be a metal and carbon, respectively.

The reactor may further comprise a reactive gas supplier for supplying a reactive gas necessary for reaction of the first sample and the second sample. Also, a recycler for re-supplying exhaust gas, discharged from the reactor, to the reactor may be further provided, and a gas supplier for supplying a gas for vaporizing the first sample and the second sample to the first vaporizer and the second vaporizer may be further provided.

In the synthesis system of the invention, the first vaporizer or the second vaporizer may comprise: a main body part that receives a sample; a sample supply part formed at one side of the main body part so as to supply the sample; a gas supply part formed at one side of the main body part so as to supply a gas for vaporizing the sample; and a discharge part formed at an upper portion of the main body part so as to discharge the vaporized sample. As such, the main body part may be made of a vitreous material such as Pyrex or quartz, or a metal material. Also, the gas supply part or the discharge part may be provided with a stopcock for preventing the sample from coming into contact with air.

In addition, the present invention provides a reactor for the large-scale composite synthesis system, comprising: a feed section connected to a connector through which a first sample and a second sample in a gas phase pass so as to receive the first sample and the second sample in a gas phase; a main body having a relatively large transverse cross-sectional diameter compared to the connector and maintained at a temperature lower than a temperature of the connector, wherein the first sample and the second sample in a gas phase are instantly dispersed due to a pressure difference and a temperature difference when being fed into the main body from the connector, so that a production reaction of a powder composite occurs, and the powder composite is electrostatically attached to an adherend surface; and a discharge section for discharging exhaust gas after the production reaction of the powder composite.

In an embodiment, a plate made of a vitreous material or a metal plate may be further provided at a lower portion of the main body of the reactor, and the powder composite may be electrostatically attached to the plate made of a vitreous material or the metal plate. As such, a filter made of quartz or a carbon material may be further provided at a lower portion of the reactor, and the plate made of a vitreous material or the metal plate may be disposed on the filter.

In another embodiment, the adherend surface to which the powder composite is electrostatically attached may be an entire inner wall of the reactor. The reactor may be made of a vitreous material such as quartz or Pyrex, or a metal material such as stainless steel, aluminum, etc.

In the above two embodiments, the feed section of the reactor is preferably configured such that the transverse cross-sectional diameter thereof is gradually increased toward the main body from the connector. Also, the transverse cross-sectional diameter of the reactor is preferably equal to or greater than 15 times a diameter of the connector. For example, the diameter of the connector may be about 3 mm, and the diameter of the reactor may be about 50 mm.

Also, a heating furnace may be further provided around the reactor, and an inside of the reactor is preferably maintained at 60° C. or less.

The first sample and the second sample for forming the composite may be two different kinds of metals, or are a metal and carbon, respectively.

In addition, the present invention provides a composite synthesis method using the large-scale composite synthesis system as above, comprising: heating a first sample so as to be vaporized; heating a second sample so as to be vaporized; feeding the vaporized first sample and the vaporized second sample into a reactor via a connector; producing a powder composite by dispersion of the first sample and the second sample in a gas phase due to a pressure difference and a temperature difference between the connector and the reactor;

electrostatically attaching the powder composite to an adherend surface. As such, the adherend surface may be a plate made of a vitreous material or a metal plate, or may be an entire inner wall of the reactor made of a vitreous material or a metal material when such a plate is not provided in the reactor.

The composite synthesis method may further comprise recycling exhaust gas, discharged from the reactor, to the reactor. Also, heating the first sample and heating the second sample may further comprise supplying a gas for vaporizing the sample to individual vaporizers. Also, producing the powder composite may further comprise supplying a reactive gas necessary for reaction of the first sample and the second sample to the reactor. In the composite synthesis method, the first sample and the second sample may be two different kinds of metals, or may be a metal and carbon, respectively.

In a large-scale composite synthesis system, a reactor for the same, and a synthesis method using the same according to the present invention, a hybrid composite, such as metal-metal or metal-carbon hybrid particles, can be synthesized while being electrostatically attached to an adherend surface without chemical bonding, thus enabling the mass production of the composite and easy recovery of the synthesized composite using a simple collection process so that it can be used in subsequent processing. Furthermore, the diameter of a connector for transporting the gas precursors and the transverse cross-sectional diameter of the reactor where the composite particles are synthesized are adjusted, thereby easily controlling the amount of the synthesized composite particles.

Also, according to the present invention, as two or more gas precursors are allowed to flow, the temperature of the reactor is adjusted, thereby effectively synthesizing a multiple-metal hybrid composite or a metal-carbon hybrid composite and controlling the appearance of the composite. Moreover, mass production of the composite is possible without additional design, even by simply changing the scale of the composite synthesis system.

Also, according to the present invention, a multiple-metal or metal-carbon hybrid composite can be prepared, and can be applied to a variety of metal and carbon-based adsorbents, absorbents, and gas and liquid membranes, or diverse catalyst processing. Furthermore, the requirements of applications thereof can be met by making changes in metal components or carbon structures.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Hereinafter, a detailed description will be given of preferred embodiments of the present invention with reference to FIGS. 1 to 5.

Figure 1:
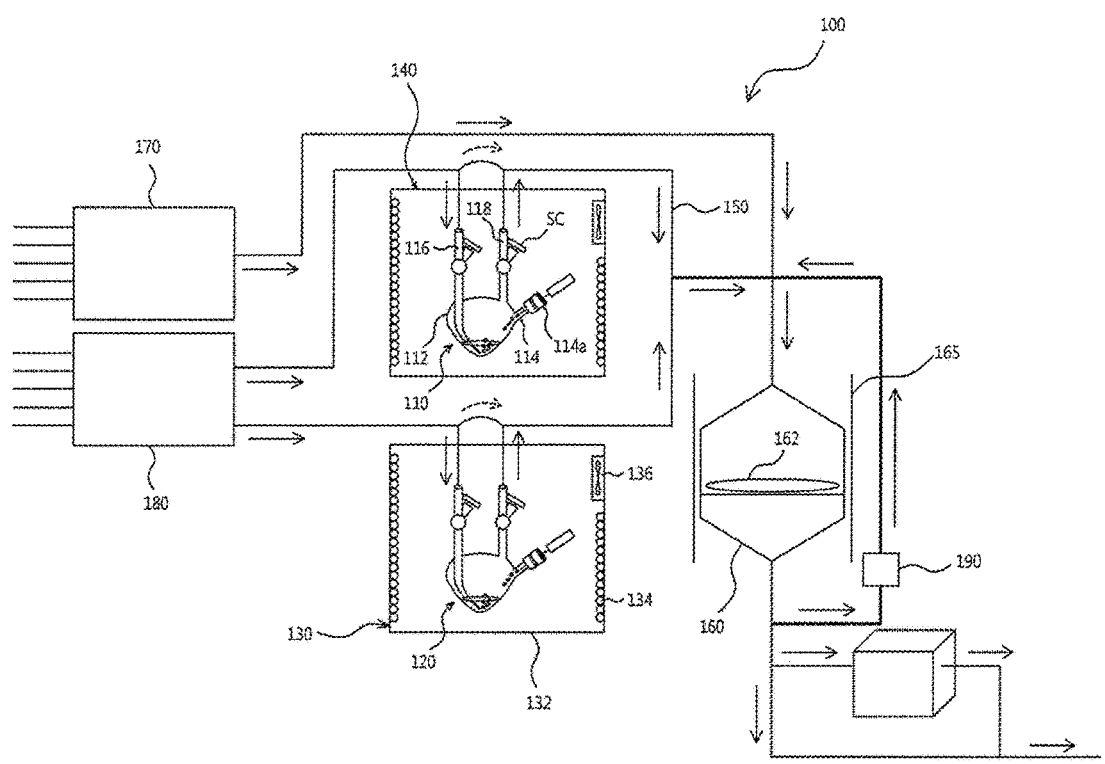
FIG. 1 is a block diagram illustrating a composite synthesis system according to the present invention.

As illustrated in FIG. 1, a composite synthesis system 100 for synthesizing a powder composite according to the present invention comprises a first vaporizer 110, a second vaporizer 120, a first heater 130, a second heater 140, a reactor 160, a reactive gas supplier 170, a gas supplier 180, and a recycler 190.

The first vaporizer 110 and the second vaporizer 120 may include a main body part 112, a sample supply part 114, a gas supply part 116, a discharge part 118, and a stopcock (SC).

The main body part 112 has a space in which the sample can be received, and is preferably made of a transparent material so that the state of the sample inside and the amount remaining can be checked. To adjust the pressure and to improve the durability, a reactor molded using a metal material may be used. When a precursor of the sample that may react with an organic material or a metal is employed, use of a stable material suitable therefor is preferable. Hence, in an embodiment of the present invention, a vitreous material such as Pyrex, quartz, etc. may be adopted.

The sample supply part 114 is connected to one side of the main body part, and is formed so as to supply the sample from the outside. Also, the end of the sample supply part 114 may be provided with a sealer 114a for tightly sealing the inside of the main body part 112. The sealer 114a may be provided in the form of a septum made of Teflon.

In the present invention, examples of the samples supplied to the first vaporizer 110 and the second vaporizer 120 may include a solid precursor and a liquid precursor. In particular, when a solid precursor is supplied to the first vaporizer 110 or the second vaporizer 120, the sealer 114a is separated from the sample supply part 114, a solid precursor in a powder phase is placed therein, and then the sealer 114a is fitted again into the sample supply part 114. Thereby, the solid precursor is supplied to the first vaporizer 110 or the second vaporizer 120 and the inside of the main body part 112 does not come into contact with external air.

In contrast, when a liquid precursor is supplied to the first vaporizer 110 or the second vaporizer 120, the inside of the main body part 112 is made into a nitrogen atmosphere, after which the liquid precursor may be supplied into the main body part 112 through the septum made of Teflon provided to the sealer 114a using an air-tight syringe.

The gas supply part 116 is used to supply the gas into the main body part 112 from a gas supplier, and is connected to the upper portion of the main body part 112. As such, the supplied gas is a gas for vaporizing the first sample or the second sample in a solid or liquid phase.

The discharge part 118 is used to discharge the vaporized sample, and is connected to the upper portion of the main body part 112. Thus, the discharge part 118 is connected to the reactor 160, and the sample vaporized in the main body part 112 may be transported into the reactor 160 via the discharge part 118.

The stopcock (SC) is provided to each of the gas supply part 116 and the discharge part 118. The stopcock (SC) functions to block the inside of the main body part 112 from the gas supplier or the reactor 160. This is because the metal or hydrocarbon-based organic material precursor used as the sample may degenerate when coming into contact with air. Furthermore, the stopcock may prevent the sample from coming into contact with external air before and after the supply of the sample to the main body part 112.

When the liquid precursor is supplied to the main body part 112, and when the inside of the main body part 112 is made into a nitrogen atmosphere, nitrogen is supplied into the main body part 112 via the gas supply part 116 from the gas supplier, after which the stopcock (SC) provided to the gas supply part 116 is closed so that nitrogen is no longer supplied. As such, the stopcock (SC) provided to the discharge part 118 is preferably in a closed state.

After vaporization of the sample, the stopcock (SC) provided to the discharge part 118 is opened, so that the vaporized sample may be transported into the reactor 160.

The sample supplied to the first vaporizer 110 is designated as the first sample, and the sample supplied to the second vaporizer 120 is designated as the second sample. The first sample and the second sample may be supplied vice versa, and may be composed of different metals, or a metal and a hydrocarbon-based organic material component.

To heat the first vaporizer 110 and the second vaporizer 120, a first heater 130 and a second heater 140 may be provided. In the present embodiment, the use of an oven type heater is illustrated.

The first heater 130 and the second heater 140 comprise a body part 132 having a space capable of accommodating the first vaporizer 110 or the second vaporizer 120 therein, a heating line part 134 formed at the inner side of the body part 132 to generate heat using external power so as to heat the inside of the body part 132, and a fan 136 for circulating the air inside the body part 132. Thereby, the temperature inside the body part 132, in which the vaporizer is provided, may always be maintained uniform by means of the fan 136.

When the first vaporizer 110 and the second vaporizer 120 are positioned respectively in the first heater 130 and the second heater 140 and heated in this way, not only the main body part 112 of the first vaporizer 110 and the second vaporizer 120 but also the sample supply part 114, the gas supply part 116 and the discharge part 118 may be heated to a predetermined temperature, compared to when the vaporizer is placed in a heating mantle manufactured in the form of a jacket or a heating furnace or an isothermally maintained heating bath. Furthermore, there are no changes in temperature due to the specific heat difference depending on the kind of material for the vaporizer because there is no temperature variation, as there is with the heating furnace, and the temperature may be easily controlled, even at low temperatures of about 100° C. or less.

The samples, which are respectively vaporized in the first vaporizer 110 and the second vaporizer 120, are transported to the reactor 160 via the connector 150. Specifically, one side of the connector 150 is connected to the outlets of the first vaporizer 110 and the second vaporizer 120, and the other side thereof is connected to the reactor 160. Also, the connector 150 is provided with a heating line (HL) so as to be heated, whereby the samples may be transported from the first and second vaporizers 110, 120 to the reactor 160 while maintained at constant temperatures.

This is because the sample in a gas phase has to be transported to the reactor 160 without condensation in the course of being delivered via the connector 150. Therefore, the temperature of the connector 150 is preferably identical to the temperature realized by the first heater 130 and the second heater 140, and the connector 150 is preferably formed to be as short as possible.

In the reactor 160, the samples vaporized by the first and second vaporizers 110, 120 are collected. A reactive gas may be supplied to the inlet of the reactor 160 from the reactive gas supplier 170 so as to react the samples, in addition to the samples vaporized by the first vaporizer 110 and the second vaporizer 120. This reactive gas may include oxygen or hydrogen. In the case where agglomeration or side-reactions may occur due to the reactive gas such as oxygen or hydrogen, nitrogen may be used.

Figure 2A:
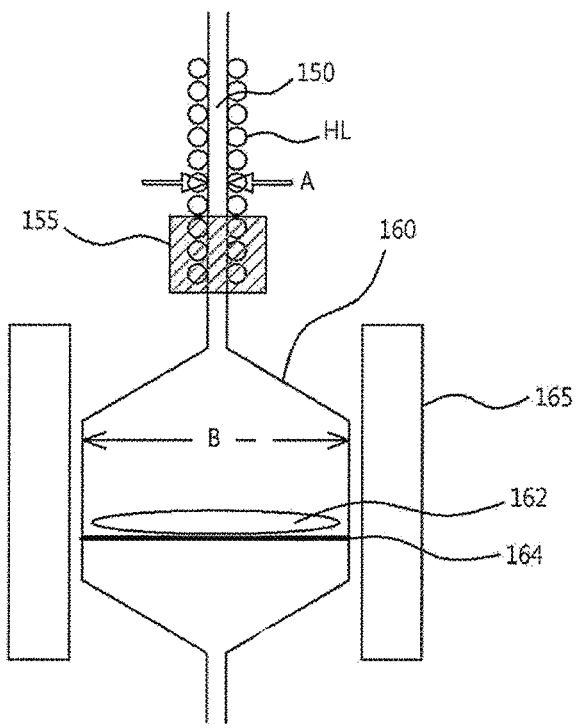
FIGS. 2A and 2B illustrate a reactor for the composite synthesis system according to the present invention.
Figure 2B:
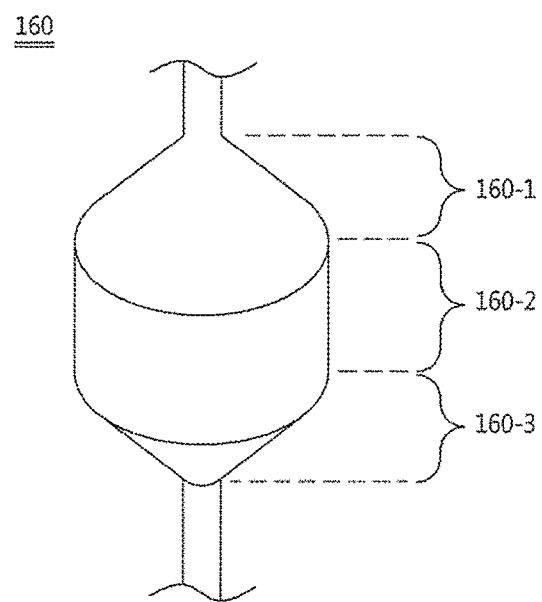

FIG. 2A is a cross-sectional view of the reactor for use in the composite synthesis system according to the present invention, and FIG. 2B is a perspective view of the reactor. As illustrated in FIGS. 2A and 2B, the reactor 160 according to the present invention may include a feed section 160-1 connected to the connector 150 so as to receive the first sample and the second sample in a gas phase, a main body 160-2, in which the first sample and the second sample in a gas phase undergo a composite synthesis reaction, and a discharge section 160-3 for discharging exhaust gas after the composite synthesis reaction. As illustrated in FIG. 2A, the connector 150 and the reactor 160 may be securely connected by means of a sealer 155.

Specifically, the reactor 160 according to the present invention is configured to have a structure and temperature conditions such that the first sample and the second sample in a gas phase may be formed into a hybrid composite, such as a metal-carbon hybrid composite, by virtue of a nozzle effect when being fed, and such a composite may be synthesized while being electrostatically attached to an adherend surface. The main body 160-2 of the reactor has a transverse cross-sectional diameter B relatively larger than the diameter A of the connector 150, and has to be maintained at a temperature lower than the temperature of the connector that transports the first sample and the second sample in a gas phase.

In order to synthesize the multiple-metal or metal-carbon hybrid particles while being electrostatically attached, as illustrated in FIG. 2A, a plate 162 made of a vitreous material or a metal material may be provided at the lower portion of the main body 160-2 of the reactor. This plate 162 made of a vitreous material or a metal material may be provided on a quartz or carbon filter 164 formed at the lower portion of the main body to collect the reaction product. Optionally, the plate 162 made of a vitreous material or a metal material is not provided at the lower portion of the main body of the reactor, and a reactor formed of a vitreous material such as quartz or Pyrex or a metal material such as stainless steel or aluminum may be provided, so that the produced composite is electrostatically attached to the entire inner wall of the reactor.

Also, a nozzle effect is generated in a specific direction in the reactor, and the composite may be synthesized on the adherend surface that faces this direction. To this end, a guide tube may be provided to extend in a specific direction in the zone ranging from the end of the connector to the feed section of the reactor, or the structure of the reactor may be variously changed. For example, in an embodiment of FIGS. 2A and 2B, the feed section of the reactor is symmetrically tilted downwards, but the feed section of the reactor may be asymmetrically formed depending on the nozzle direction to be set, and the structure of the main body may be variously modified depending on the structure of the feed section of the reactor.

The transverse cross-sectional inner diameter B of the main body of the reactor according to the present invention is preferably formed to be equal to or greater than 15 times the inner diameter A of the connector. For example, the inner diameter A of the connector 150 may be about 3 mm, and the transverse cross-sectional inner diameter B of the main body 160-2 may be about 50 mm. As such, the total length of the reactor may be about 50 mm, and the diameter of the plate made of a vitreous material or the metal plate may approximate 40 mm. However, the dimensions of the connector and the main body of the reactor are not particularly limited to the above numerical values, and any dimensions may be realized without limitation so long as a nozzle effect for producing a hybrid composite such as metal-metal or metal-carbon hybrid particles may be induced. Thus, when the diameter of the connector and the transverse cross-sectional diameter of the main body of the reactor for synthesizing the composite particles are adjusted in this way, the amount of the composite particles that are synthesized on the adherend surface, such as the surface of the plate made of a vitreous material or the metal plate, or the inner wall of the reactor, may be easily controlled.

Also, the temperature inside the main body 160-2 is preferably maintained at a temperature lower than the temperature of the connector, for example at 60° C. or less. To uniformly maintain the temperature of the main body of the reactor so as to carry out the reaction of the vaporized samples, a heating furnace may be provided around the reactor. The inside of the connector that transports the first sample and the second sample in a gas phase is preferably maintained at a temperature from 60 to 250° C.

Hence, when the first sample and the second sample in a gas phase are fed into the main body 160-2 from the connector 150, an effect of diffusing a gas transported through a thin pipe into the main body of a reactor having a relatively large cross-section, that is, a nozzle effect, may occur. Furthermore, as the first sample and the second sample, which are transported in a gas phase, are instantly dispersed into the main body of the reactor, which is maintained at a relatively low temperature compared to the connector, by virtue of a nozzle effect, composite particles having a size on the order of nanometers may result. The resultant composite particles are electrostatically attached via Van der Waals force to the adherend surface, such as the surface of the plate made of a vitreous material or the metal plate provided at the lower portion of the main body of the reactor, or the inner wall of the reactor made of a vitreous material or a metal material in the absence of such a plate. Thereby, a hybrid composite such as metal-carbon hybrid particles may be synthesized while being electrostatically attached to the adherend surface without chemical bonding to the adherend surface.

The reactor 160 according to the present invention may be molded using a metal material, or may be made of a vitreous material. In order to observe the inside of the reactor without affinity to the synthesized composite particles, quartz glass or Pyrex is preferably used. When the reactor is formed of a vitreous material and the metal plate is provided at a lower portion of the reactor, all of the synthesized composite particles may be completely attached to the metal plate, instead of being attached to the wall of the reactor. Although not particularly limited, the metal material may include any one selected from among aluminum, nickel, silicon, and aluminum-based alloys containing at least one selected from nickel, magnesium, iron, silicon, and sulfur elements.

In the system for synthesizing a powder composite, the reactor thererfor and the synthesis method using the same according to the present invention, a hybrid composite such as metal-metal or metal-carbon hybrid particles may be synthesized while being electrostatically attached to the plate made of a vitreous material or the metal plate, or the inner wall of the reactor made of a vitreous material or a metal material, without chemical bonding to the adherend surface, thus enabling mass production of the composite and easily recovering the synthesized composite so that it can be used in subsequent processing.

Although not particularly limited, the feed section 160-1 at the upper portion of the reactor 160 is configured such that the transverse cross-sectional diameter thereof is gradually increased toward the main body 160-2 from the connector 150, and thus the sample in a gas phase may be effectively dispersed to the main body of the reactor from the connector. Also, the discharge section 160-3 at the lower portion of the reactor 160 is configured such that the transverse cross-sectional diameter thereof is gradually decreased downwards, and thus exhaust gas may be effectively discharged after synthesis of the composite.

The reactive gas supplier 170 is provided to supply a reactive gas to the reactor 160. As such, the reactive gas may include oxygen, hydrogen, or nitrogen, to activate the reaction of the vaporized samples. As illustrated in FIG. 1, the samples vaporized in the first vaporizer 110 and the second vaporizer 120 are mixed before reaching the reactor 160, and the reactive gas is fed from the reactive gas supplier 170 through a separate channel.

The gas supplier 180 is connected to the gas supply part 116 of the first vaporizer 110 and the second vaporizer 120 in order to supply a gas for vaporizing the samples. Such a gas may include nitrogen.

The recycler 190 may be provided to re-supply to the reactor 160 the exhaust gas discharged from the discharge section 160-3 of the reactor 160. The recycler 190 may include a mini pump (recycling pump) or a solenoid valve, and the discharged exhaust gas is re-supplied to the reactor 160 by the recycler 190 so as to react further. As such, a release valve may be additionally provided to maintain the pressure.

Figure 3:
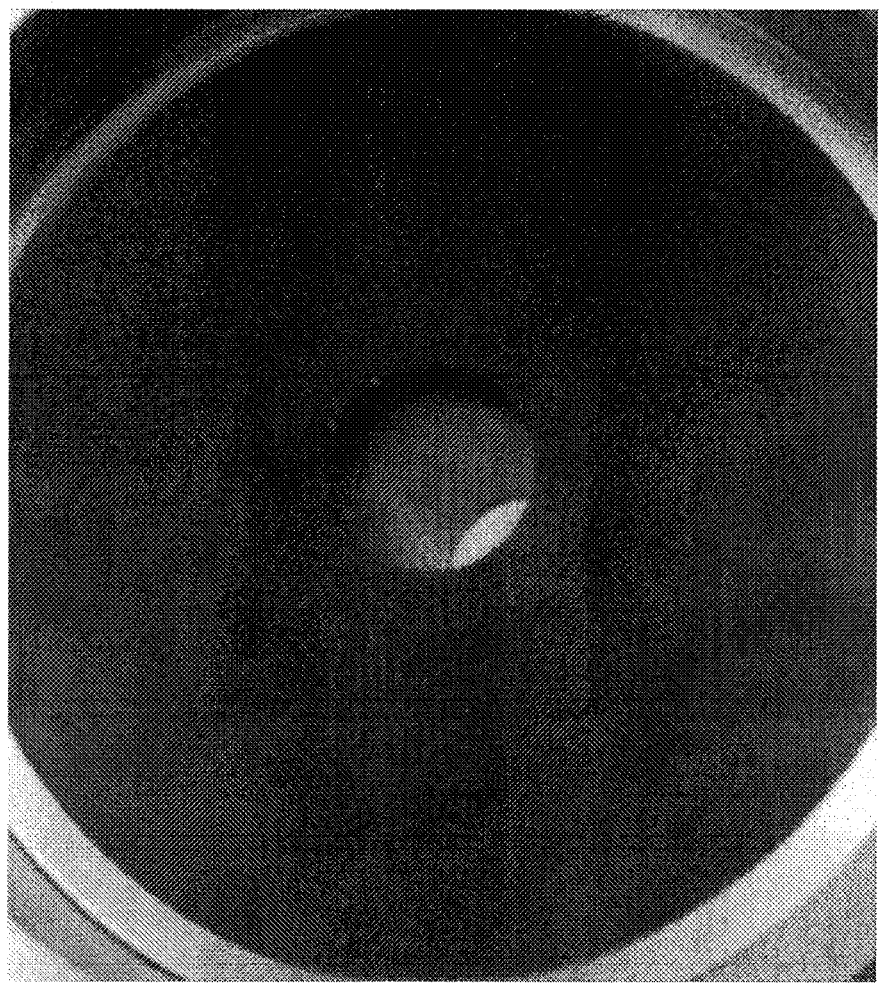
FIG. 3 illustrates the appearance of a metal-carbon nanocomposite formed on the surface of a metal plate having a center hole using the composite synthesis system according to the present invention.
Figure 4:
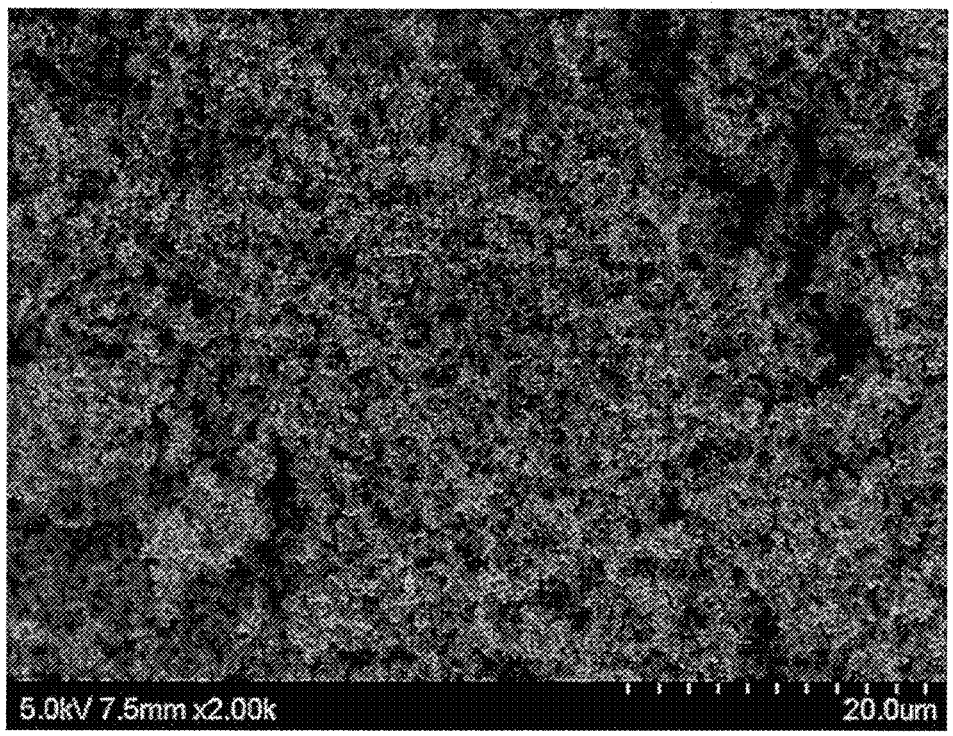
FIG. 4 illustrates the results of scanning electron microscopy of a metal-carbon hybrid composite formed on the surface of a metal plate using the composite synthesis system according to the present invention.
Figure 5:
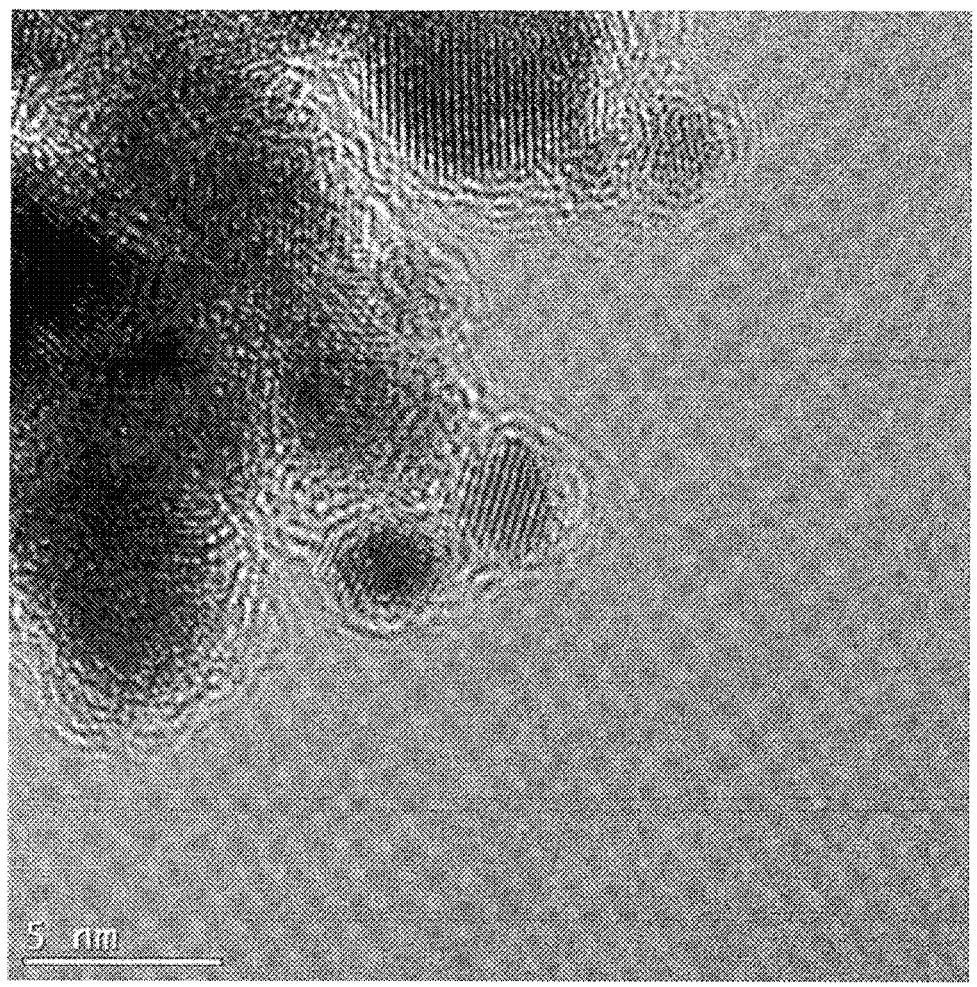
FIG. 5 illustrates the results of transmission electron microscopy of a platinum-carbon hybrid composite formed on the surface of a metal plate using the composite synthesis system according to the present invention.

FIG. 3 illustrates the appearance of the metal-carbon nanocomposite formed on the surface of the metal plate having a center hole using the large-scale composite synthesis system thus configured. Also, FIG. 4 illustrates the results of scanning electron microscopy of the metal-carbon hybrid composite formed on the surface of the plate made of a vitreous material or the metal plate using the composite synthesis system according to the present invention, and FIG. 5 illustrates the results of transmission electron microscopy of the platinum-carbon hybrid composite formed on the surface of the metal plate.

The characteristic configuration of the large-scale composite synthesis system according to the present invention has been described above. Also, with regard to the configuration that overlaps the configuration disclosed in Korean Patent Application No. 10-2012-0045516, which was first filed by the present applicant, contents that are not mentioned herein may be understood with reference to the disclosure of the earlier application.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A composite synthesis system, comprising:
a first vaporizer for vaporizing a first sample for synthesis reaction;
a second vaporizer for vaporizing a second sample for synthesis reaction with the first sample;
a first heater for heating the first vaporizer;
a second heater for heating the second vaporizer;
a connector for connecting the first vaporizer and the second vaporizer to a reactor; and
the reactor that receives the first sample and the second sample respectively vaporized in the first vaporizer and the second vaporizer so as to synthesize a composite, wherein the reactor has a relatively large transverse cross-sectional diameter compared to the connector, and is maintained at a temperature lower than a temperature of the connector, and
the first sample and the second sample in a gas phase are instantly dispersed due to a pressure difference and a temperature difference when being fed into the reactor from the connector, thereby producing a powder composite, and the powder composite is synthesized while being electrostatically attached to an adherend surface, wherein the adherend surface comprises a plate made of a vitreous material or a metal plate provided at a lower portion of the reactor, and
the powder composite is electrostatically attached to the plate made of a vitreous material or the metal plate, and
wherein a filter made of quartz or a carbon material is further provided at a lower portion of the reactor, and the plate made of a vitreous material or the metal plate is disposed on the filter.

2. The composite synthesis system of claim 1, wherein the metal plate comprises any one selected from among aluminum, nickel, silicon, and aluminum-based alloys containing at least one selected from nickel, magnesium, iron, silicon, and sulfur elements.

3. The composite synthesis system of claim 1, wherein the transverse cross-sectional diameter of the reactor is equal to or greater than 15 times a diameter of the connector.

4. The composite synthesis system of claim 1, wherein a heating furnace is further provided around the reactor, and an inside of the reactor is maintained at 60° C. or less.

5. The composite synthesis system of claim 1, wherein the connector is further provided with a heating line for heating the first sample and the second sample in a gas phase, which are transported to the reactor via the connector, and an inside of the connector is maintained at 60 to 250° C.

6. The composite synthesis system of claim 1, wherein the reactor further comprises a reactive gas supplier for supplying a reactive gas necessary for reaction of the first sample and the second sample.

7. The composite synthesis system of claim 1, wherein the adherend surface further comprises an entire inner wall of the reactor made of a vitreous material or a metal material.

8. The composite synthesis system of claim 1, further comprising a recycler for re-supplying exhaust gas, discharged from the reactor, to the reactor.

9. The composite synthesis system of claim 1, wherein the first vaporizer or the second vaporizer comprises:
a main body part that receives a sample;
a sample supply part formed at one side of the main body part so as to supply the sample;
a gas supply part formed at one side of the main body part so as to supply a gas for vaporizing the sample; and
a discharge part formed at an upper portion of the main body part so as to discharge the vaporized sample.

10. A reactor for a composite synthesis system, comprising:
a feed section connected to a connector through which a first sample and a second sample in a gas phase pass so as to receive the first sample and the second sample in a gas phase;
a main body having a relatively large transverse cross-sectional diameter compared to the connector and maintained at a temperature lower than a temperature of the connector, wherein the first sample and the second sample in a gas phase are instantly dispersed due to a pressure difference and a temperature difference when being fed from the connector, so that a production reaction of a powder composite occurs, and the powder composite is electrostatically attached to an adherend surface; and a discharge section for discharging exhaust gas after the production reaction of the powder composite, wherein the adherend surface comprises a plate made of a vitreous material or a metal plate provided at a lower portion of the main body, and the powder composite is electrostatically attached to the plate made of a vitreous material or the metal plate, and wherein a filter made of quartz or a carbon material is further provided at a lower portion of the main body, and the plate made of a vitreous material or the metal plate is disposed on the filter.

11. The reactor of claim 10, wherein the metal plate comprises any one selected from among aluminum, nickel, silicon, and aluminum-based alloys containing at least one selected from nickel, magnesium, iron, silicon, and sulfur elements.

12. The reactor of claim 10, wherein the feed section is configured such that the transverse cross-sectional diameter thereof is gradually increased toward the main body from the connector.

13. The reactor of claim 10, wherein the transverse cross-sectional diameter of the main body is equal to or greater than 15 times a diameter of the connector.

14. The reactor of claim 10, wherein the reactor is made of a vitreous material or a metal material.

15. A composite synthesis method using the composite synthesis system of claim 1, comprising:

heating a first sample in the first vaporizer so as to be vaporized;

heating a second sample in the second vaporizer so as to be vaporized;

feeding the vaporized first sample and the vaporized second sample into the reactor via the connector;

producing a powder composite by dispersion of the first sample and the second sample in a gas phase due to a pressure difference and a temperature difference between the connector and the reactor; and electrostatically attaching the powder composite to the plate made of a vitreous material or the metal plate, or to an entire inner wall of the reactor made of a vitreous material or a metal material.

\* \* \* \* \*